US012525217B2

(12) United States Patent
Tapias et al.

(10) Patent No.: US 12,525,217 B2
(45) Date of Patent: Jan. 13, 2026

(54) AUDIO COMMUNICATION BETWEEN PROXIMATE DEVICES

(71) Applicant: Micron Technology, Inc., Boise, ID (US)

(72) Inventors: Nicholas R. Tapias, Boise, ID (US); Anthony J. Kanago, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 204 days.

(21) Appl. No.: 18/417,273

(22) Filed: Jan. 19, 2024

(65) Prior Publication Data

US 2024/0274113 A1 Aug. 15, 2024

Related U.S. Application Data

(60) Provisional application No. 63/445,981, filed on Feb. 15, 2023.

(51) Int. Cl.
*G10K 11/178* (2006.01)
*H04R 1/10* (2006.01)

(52) U.S. Cl.
CPC .. *G10K 11/17823* (2018.01); *G10K 11/17827* (2018.01); *G10K 11/17873* (2018.01); *H04R 1/1041* (2013.01); *H04R 1/1083* (2013.01); *G10K 2210/1081* (2013.01); *G10K 2210/30231* (2013.01); *G10K 2210/3027* (2013.01); *G10K 2210/3028* (2013.01); *G10K 2210/3044* (2013.01); *H04R 2420/07* (2013.01); *H04R 2460/01* (2013.01)

(58) Field of Classification Search
CPC ....... G10K 11/17823; G10K 11/17827; G10K 11/17873; G10K 2210/1081; G10K 2210/30231; G10K 2210/3027; G10K 2210/3028; G10K 2210/3044; H04R 1/1041; H04R 1/1083; H04R 2420/07; H04R 2460/01
USPC ...... 381/71.6, 71.1, 71.3, 71.8, 7, 1.14, 311, 381/91, 122, 375; 704/200, 231, 233; 455/41.1, 41.2, 90.3, 73
See application file for complete search history.

(56) References Cited

U.S. PATENT DOCUMENTS

2008/0201138 A1* 8/2008 Visser ................. G10L 21/0272 704/227
2009/0060207 A1* 3/2009 Barry ....................... H04R 5/04 381/17

(Continued)

*Primary Examiner* — Vivian C Chin
*Assistant Examiner* — Con P Tran
(74) *Attorney, Agent, or Firm* — Dorsey & Whitney LLP

(57) ABSTRACT

Techniques, apparatuses, and systems for wireless communication between proximate devices are disclosed. A first microphone on a first wearable audio device of a first user receives first audio signals that include speech from a second user proximate to the first user and ambient noise from an environment surrounding the first wearable audio device. The first audio signals are analyzed to determine primary audio directed to the first user. The primary audio is compared to other audio signals received through wireless communication channels between the first wearable audio device and one or more other wearable audio devices. In doing so, some of the other audio signals are determined to be similar to the primary audio and are thus output to the first wearable audio device. As a result, two users can accurately communicate, even in a noisy environment.

20 Claims, 4 Drawing Sheets

(56) References Cited

U.S. PATENT DOCUMENTS

| | | | | |
|---|---|---|---|---|
| 2017/0084286 | A1* | 3/2017 | Kim | G10L 21/0216 |
| 2021/0219065 | A1* | 7/2021 | El-Hoiydi | H04L 47/2416 |
| 2023/0188907 | A1* | 6/2023 | Bhowmik | H04R 25/554<br>381/315 |
| 2024/0323620 | A1* | 9/2024 | Müller-Wehlau | H04R 25/552 |
| 2024/0414486 | A1* | 12/2024 | Solum | H04R 25/554 |

* cited by examiner

AUDIO COMMUNICATION BETWEEN PROXIMATE DEVICES

CROSS-REFERENCE TO RELATED APPLICATION(S)

The present application claims priority to U.S. Provisional Patent Application No. 63/445,981, filed Feb. 15, 2023, the disclosure of which is incorporated herein by reference in its entirety.

TECHNICAL FIELD

The present disclosure generally relates to audio communication devices and more particularly relates to audio communication between proximate devices.

BACKGROUND

Wearable audio devices (e.g., headphones or earpieces) output audio to a user. Many wearable audio devices include noise cancellation technology to reduce ambient noise from an environment surrounding the wearable audio devices. Noise cancellation can be performed by collecting audio signals representative of ambient noise in the environment using a microphone of a wearable audio device. The audio signals can be analyzed to generate antiphase signals, which are output through a speaker of the wearable audio device to cancel the ambient noise. In doing so, the wearable audio device can output audio with minimal interference from ambient noise in the environment surrounding the wearable audio device.

DETAILED DESCRIPTION

Figure 1:
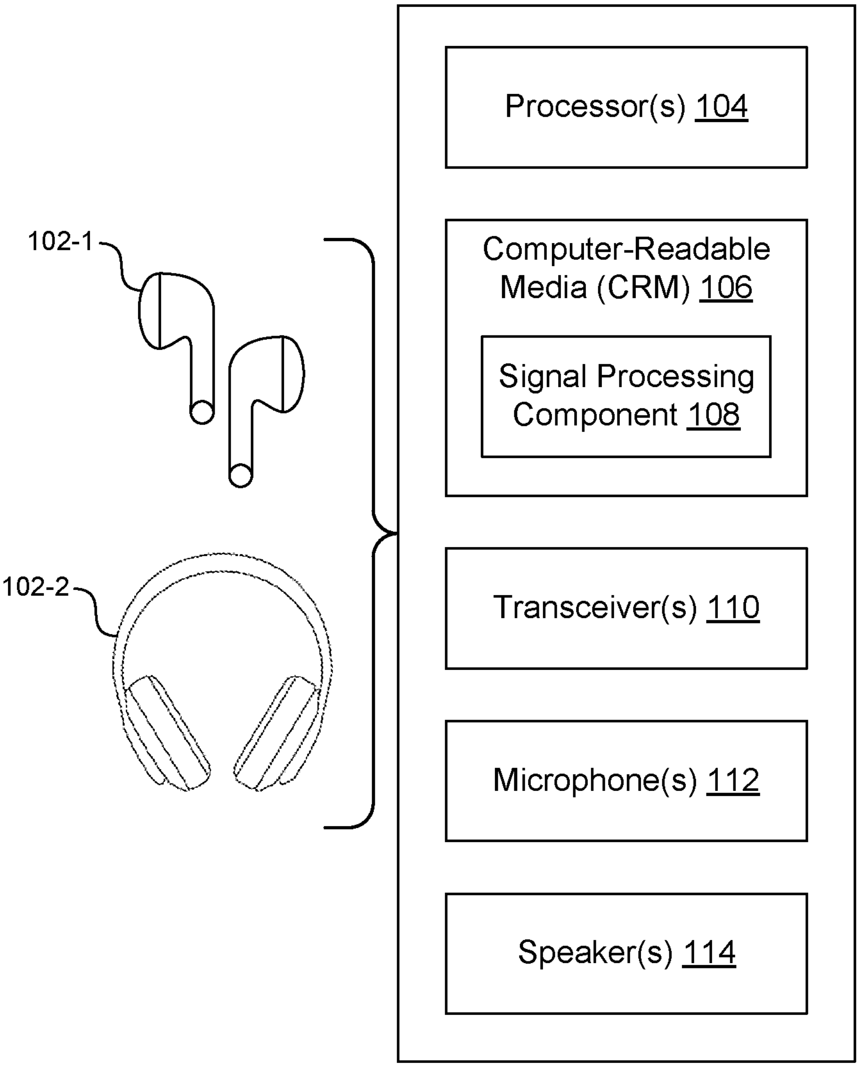
FIG. 1 illustrates a wearable audio device in accordance with embodiments of the present technology.

In noisy environments, users can struggle to communicate due to high ambient noise. Communication can become especially difficult when the users are communicating information that may be foreign to one of the users or when accuracy of the information is increasingly important. Take, for example, a situation in which a first user is training a second user to perform a job function while in a noisy factory. The noisy factory includes various equipment that interferes with the communication between the users. As a result, the users are not able to communicate accurately and efficiently with one another.

A user can wear an audio device (e.g., headphones or earpieces) to enable audio to be output directly to the user. For example, an audio device can include a microphone that collects speech from a user, and the speech can be output through a speaker of another audio device connected to the audio device and worn by another user. In this way, speech can be communicated between the two users using the audio devices. In a noisy environment, however, the user's microphone can collect ambient noise from the environment, which can interfere with the audibility of the speech. Moreover, the ambient noise from the environment can make it difficult for the other user to hear the audio output.

Many wearable audio devices include noise cancellation technology to reduce ambient noise from an environment surrounding the wearable audio devices. However, noise cancellation fails to isolate the speech from the ambient noise, canceling the speech and the ambient noise alike. Accordingly, additional techniques may be used to enable accurate communication between multiple users.

Specifically, the audio devices disclosed herein enable a first microphone on a first audio device of a first user to receive first audio signals that include speech from a second user and ambient noise from an environment surrounding the first audio device. A second microphone on a second audio device can collect second audio signals that include the speech from the second user and ambient noise from the environment surrounding the second audio device. The first audio device can determine that a portion of the first audio signals includes speech directed to the first user. The portion of the first audio signals can be compared to the second audio signals to isolate a portion of the second audio signals that includes the speech from a portion that includes the ambient noise. In doing so, the second audio signals can be transmitted to the first audio device where they are played back such that the ambient noise is attenuated, thereby improving the audibility of the speech from the second user.

The audio devices disclosed herein can similarly determine which speech should be output to a first user when multiple users are speaking in close proximity to the first user. For example, a second user can speak to the first user, and a third user can speak to a fourth user in close enough proximity to the first user to be captured by a first microphone on a first audio device of the first user. A second microphone on a second audio device of the second user can collect audio signals that include speech from the second user, and a third microphone on a third audio device of the third user can collect audio signals that include speech from the third user. First audio signals collected by the first microphone can be analyzed to determine which portion of the first audio signals includes speech directed to the first user. The portion of the first audio signals can then be compared to the second audio signals and the third audio signals to determine which of the second or third audio signals is more similar to the portion of the first audio signals. In this case, the audio signals collected by the second device can be determined as more similar given that these audio signals include the speech directed to the first user. The audio signals collected by the second device can thus be output using a speaker on the first audio device to accurately communicate the speech from the second user to the first user.

This disclosure now turns to various techniques, apparatuses, and systems for communication between proximate devices. Various embodiments of the present technology are described with respect to FIGS. 1-4.

Example Devices and Systems

FIG. 1 illustrates a wearable audio device 102 in accordance with embodiments of the present technology. As illustrated, the wearable audio device 102 can include an earpiece 102-1 (e.g., earbuds) or headphones 102-2. In other embodiments, the wearable audio device 102 can be replaced with an electronic device having at least one speaker (e.g., a mobile phone, a laptop, a tablet, or an external speaker). As shown, the wearable audio device 102 includes at least one processor 104 and at least one computer-readable media (CRM) 106, which can include memory media or storage media. The at least one processor 104 can include any appropriate processor, for example, a microcontroller, a microprocessor, an embedded processor, a digital signal processor, a central processing unit, an application-specific integrated circuit, and so on. In some cases, the processor 104 and the CRM 106 can be implemented together as a system-on-chip (SoC).

The CRM 106 can include volatile or non-volatile memory. The CRM 106 can be local, remote, or distributed. The CRM 106 can include a single media or multiple media (e.g., a centralized/distributed database and/or associated caches and servers). The CRM 106 can include any media that is capable of storing, encoding, or carrying a set of computer-executable instructions that can be executed by the processor 104 to perform one or more of the functionalities described herein. The CRM 106 can be non-transitory or comprise a non-transitory device. In this context, a non-transitory storage media can include a device that is tangible, meaning that the device has a concrete physical form, although the device can change its physical state. Thus, for example, non-transitory refers to a device remaining tangible despite this change in state.

In aspects, the CRM 106 can include a signal processing component 108. For example, the signal processing component 108 can process audio signals into audio data, and vice versa. The signal processing component 108 can perform filtering or transformations to isolate individual portions of the audio signals. In some implementations, the signal processing component 108 can compare two or more audio signals to determine similarity (e.g., shape or strength) between the signals. In aspects, the signal processing component 108 can generate signals (e.g., antiphase signals for noise cancellation) based on the audio signals. The audio signals can be transmitted or received using at least one transceiver 110.

The transceiver 110 can include at least one antenna for wireless communication. The wearable audio device 102 can communicate through a short-range wireless communication technology (e.g., Bluetooth (BT) or ultra-wideband (UWB)). In other aspects, the wearable audio device 102 can communicate over a local-area network (LAN), a wireless local-area network (WLAN), a personal-area network (PAN), a wide-area network (WAN), an intranet, the Internet, a peer-to-peer network, a point-to-point network, or a mesh network. The wearable audio device 102 can communicate with any other wireless device (e.g., an additional wearable audio device). In some cases, the wearable audio device 102 can communicate with an electronic device (e.g., a smartphone) paired with the wearable audio device 102. One or more of the functionalities of the wearable audio device 102 (e.g., functionalities of the signal processing component 108) can be performed at the electronic device and communicated to the wearable audio device 102. In this way, a computing system that implements audio communication between proximate devices can include one or more additional devices paired with the wearable audio device 102.

The wearable audio device 102 can further include at least one microphone 112 and at least one speaker 114. The at least one microphone 112 can capture audio signals through the microphone, which can include audio data. For example, the microphone 112 can capture speech from a user of the wearable audio device 102 or ambient noise from an environment surrounding the wearable audio device 102. The speaker 114 can output audio to a user of the wearable audio device 102. In aspects, the speaker 114 can output antiphase signals to perform noise cancellation with respect to audio data captured through the microphone 112 (e.g., ambient noise from the environment surrounding the wearable audio device 102).

Figure 2:
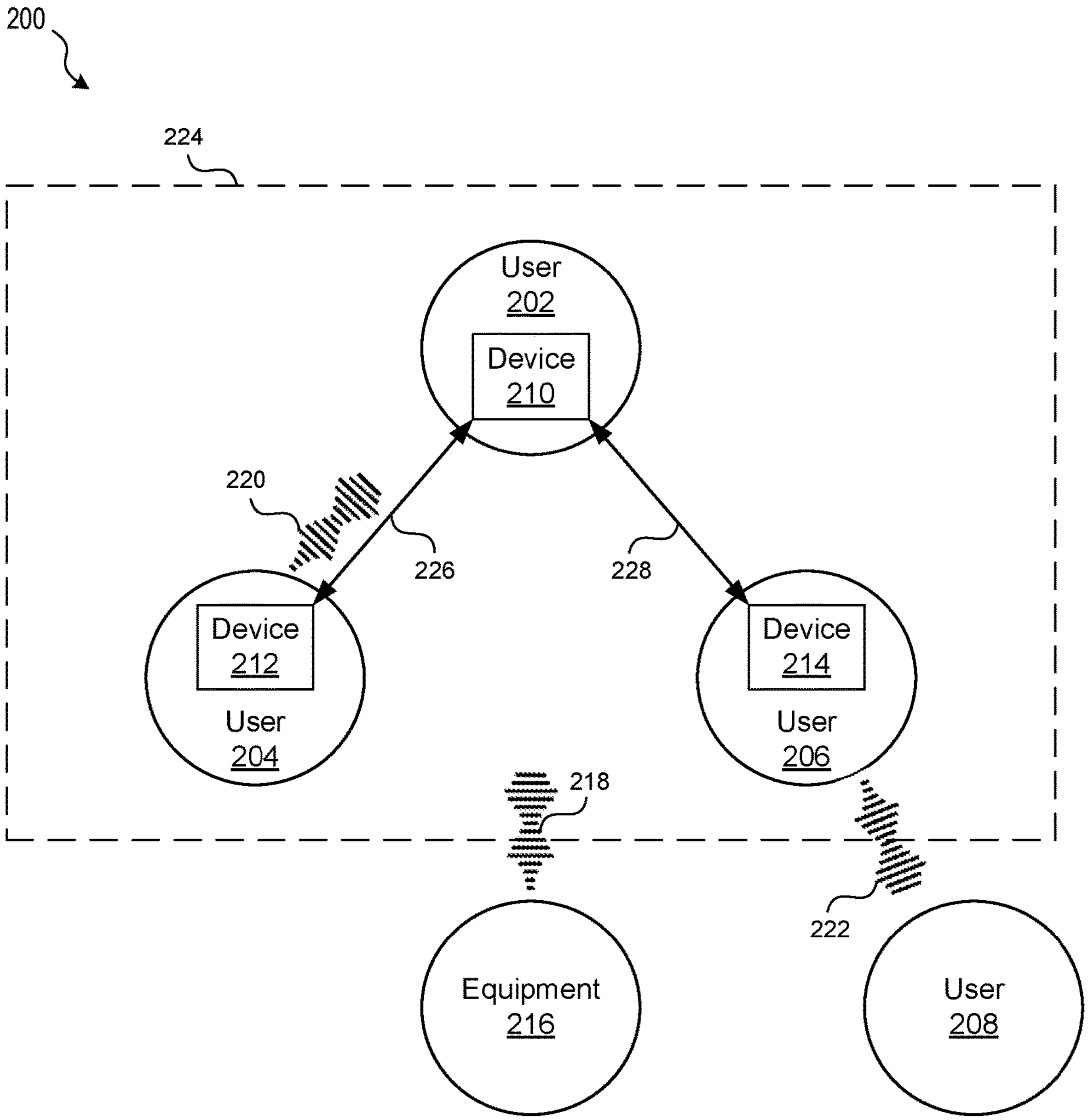
FIG. 2 illustrates an environment for audio communication between proximate devices in accordance with embodiments of the present technology.

FIG. 2 illustrates an environment 200 for audio communication between proximate devices in accordance with embodiments of the present technology. In aspects, two devices can be "proximate" when the devices are located close enough to one another to enable a microphone on a first device to pick up audio originating near a second device (e.g., from a user wearing the second device or within 1, 5, 10, or 15 feet of the second device), or vice versa. As illustrated, the environment 200 includes a first user 202, a second user 204, a third user 206, and a fourth user 208. The first user 202 can utilize a first wearable audio device 210, the second user 204 can utilize a second wearable audio device 212, and the third user 206 can utilize a third wearable audio device 214. In some cases, the fourth user 208 can similarly utilize a fourth wearable audio device. The environment 200 further includes equipment 216 that produces noise 218. The second user 204 can face toward and speak to the first user 202. The speech 220 can represent the speech from the second user 204 to the first user 202. Similarly, the third user 206 can face toward and speak to the fourth user 208, and the speech 222 can represent this speech.

In aspects, the environment 200 is a noisy environment in which it is difficult to hear. As a result, the first user 202 may be unable to hear the speech 220 directed to them. Some wearable audio devices can utilize noise cancellation to cancel out noise surrounding the devices. However, noise cancellation may similarly cancel the ambient noise and the speech that the user wishes to hear. Accordingly, some noise cancellation techniques may be ineffective for enabling the user to hear speech in a noisy environment. To solve these problems and others, aspects of the wearable audio devices described herein can utilize wireless communication to augment noise cancellation, which can improve the audibility of speech between two users.

The first wearable audio device 210, the second wearable audio device 212, and the third wearable audio device 214 can be connected through a network 224. As a result, the first wearable audio device 210 and the second wearable audio device 212 can communicate through the wireless communication channel 226, and the first wearable audio device 210 and the third wearable audio device 214 can communicate through the wireless communication channel 228. In some implementations, the wireless communication channel 226 and the wireless communication channel 228 can include a short-range wireless communication channel (e.g., a BT channel or UWB channel), which enables the communication of audio data. In aspects, the wireless communication channel 226 and the wireless communication channel 228 can include a single wireless communication channel.

The network 224 can be connected using an electronic device (e.g., smartphone, laptop, or tablet) paired with the first wearable audio device 210. For example, the electronic device can send a request on behalf of the first wearable audio device 210 to the second wearable audio device 212 or the third wearable audio device 214 to enable wireless communication between the devices. The second wearable audio device 212 or the third wearable audio device 214 can accept the request to connect the network 224. In other aspects, the network 224 can be connected without utilizing an electronic device separate from the wearable audio devices.

As illustrated in FIG. 1, the wearable audio devices can include a microphone configured to receive audio signals from the user or the environment surrounding the device. For example, a first microphone of the first wearable audio device 210 can collect first audio signals from the environment 200. For example, the first microphone can collect first audio signals that include speech directed to the first user 202 (e.g., speech 220) and ambient noise from the environment 200 (e.g., noise 218 and speech 222). Similarly, a second microphone of the second wearable audio device 212 can collect second audio signals that include the spoken word of the second user 204 (e.g., speech 220) and ambient noise from the environment 200 (e.g., noise 218 and speech 222). A third microphone of the third wearable audio device 214 can similarly collect third audio signals that include the speech 222 from the third user 206 and ambient noise (e.g., noise 218 and speech 220).

Given that the speech 222 may not be heard by the first user 202 due to the noise in the environment 200, the second wearable audio device 212 can transmit the second audio data, which includes the speech 220 collected using the second microphone, through the wireless communication channel 226 to the first wearable audio device 210, where it can be output to the first user 202 using a speaker of the first wearable audio device 210. However, as discussed above, the second audio data can include ambient noise from the environment that can interfere with the audibility of the speech 220. Moreover, additional wearable audio devices can transmit audio signals to the first wearable audio device 210, which can include speech or ambient noise that is not directed to the first user 202. For example, the third audio signals, which include the speech 222 directed to the fourth user 208, can be transmitted from the third wearable audio device 214 to the first wearable audio device 210 through the wireless communication channel 228. Accordingly, additional techniques may be used to determine which audio signals, or which portion of the audio signals, include audio directed to the first user 202 (e.g., speech 220) and thus should be output to the first user 202 through the first wearable audio device 210.

In some implementations, the primary audio (e.g., the audio directed to the first user 202 that the first user 202 wishes to hear over the ambient noise) can be determined by analyzing the first audio signals collected using the first microphone. For example, the first wearable audio device 210 can process the first audio signals to separate the first audio signals into portions (e.g., through filtering, peak finding, transformations, or any other techniques). A first portion of the first audio signals can include audio signals indicative of the speech 220 collected through the first microphone. One or more second portions of the first audio signals can include audio signals indicative of the ambient noise from the environment 200 (e.g., speech 222 or noise 218) collected through the first microphone. Once separated, the first portion of the first audio signals that includes the speech 220 can be compared to the one or more second portions of the first audio signals that include the ambient noise to determine which audio is primary. In aspects, the primary audio can be determined as the audio that has a higher strength (e.g., signal-to-noise ratio or magnitude), that more closely matches an expected signal shape (e.g., a signal shape indicative of speech), or that has any other characteristic.

In the example illustrated in FIG. 2, the first portion of the first audio signals, which includes the speech 220 from the second user 204, can have a greater signal strength than the one or more second portions, which include the noise 218 from the equipment 216 and the speech 222 from the third user 206, because the second user 204 is closer to the first user 202 than the equipment 216 and the second user 204 is facing the first user 202, while the third user 206 is facing, and speaking, away from the first user 202. Accordingly, the first portion of the first audio signals can be determined as the primary audio. Alternatively, or additionally, the first portion of the first audio signals can be determined as the primary audio because it has similar characteristics to audio signals that indicate speech.

Once the primary audio is determined, the primary audio can be compared to the audio signals transmitted to the first wearable audio device 210 to determine which of these audio signals, or which portions of these audio signals, are most similar to the primary audio and thus should be output to the first user 202 through the first wearable audio device 210. For example, as illustrated in FIG. 2, the first wearable audio device 210 receives the second audio signals and the third audio signals from the second wearable audio device 212 and the third wearable audio device 214, respectively. The first portion of the first audio signals, which includes the speech 220 collected through the first microphone and has been determined as the primary audio, can be compared to the second audio signals and the third audio signals to determine which of these audio signals more closely align to the primary audio. In this example, the second audio signals may primarily include the speech 220 because the second microphone on the second wearable audio device 212 is close to the mouth of the second user 204, while the third audio signals primarily include the speech 222 because the third microphone on the third wearable audio device 214 is close to the mouth of the third user 206. Accordingly, the second audio signals can be determined to be more similar to the primary audio in comparison to the third audio signals. As a result, the second audio signals (e.g., but not the third audio signals) can be output to the first user 202 through the speaker of the first wearable audio device 210 to enable the speech 220 to be communicated even when located in a noisy environment.

In some cases, the second audio signals and the third audio signals can both include the speech 220. For example, the second audio signals can include the speech 220 collected through the second microphone, which is located near the mouth of the second user 204, and the third audio signals can include the speech 220 collected through the third microphone, which collects the speech 220 due to the proximity between the second wearable audio device 212 and the third wearable audio device 214. However, the audio signals from the second audio signals that indicate the speech 220 can have higher strength than the audio signals that indicate the speech 220 in the third audio signals due to the closeness of the second user 204 to the respective microphones that collect the audio signals. Thus, although both the second audio signals and the third audio signals include audio signals indicative of the speech 220, the second audio signals can be determined as more similar to the primary audio based on the strength of the portion of the second audio signals that is indicative of the speech 220.

As discussed, the primary audio can be used to determine which of the multiple audio signals that have been transmitted to the first wearable audio device 210 to output. Alternatively, or additionally, the primary audio can be used to determine the individual portions of the audio signals that are similar to the primary audio. For example, the first portion of the first audio signals, which has been determined as the primary audio, can be compared to the second audio signals to determine a first portion of the second audio signals that is similar to the primary audio and one or more second portions of the second audio signals that are different from the primary audio. For example, the second audio signals can be separated into different portions, where the first portion includes the audio signals that are indicative of the speech 220, and the one or more second portions include the audio signals that are indicative of the ambient noise (e.g., the noise 218 and the speech 222).

Given that the first portion of the second audio signals is determined as the portion similar to the primary audio, the second audio signals can be output to the first user 202 through the first wearable audio device 210 such that the first portion of the second audio signals is output with reduced interference from the one or more second portions of the second audio signals. For example, the one or more second portions of the second audio signals can be attenuated (e.g., by filtering out the one or more second portions or outputting antiphase signals that cancel or diminish the one or more second portions). Moreover, the first portion of the second audio signals can be amplified to improve the audibility of the first portion of the second audio signals output through the speaker of the first wearable audio device 210. Thus, the wireless communication channel 226 can be used to enable the second user 204 to communicate with the first user 202, even when in the noisy environment.

In aspects, the noise from the environment 200 can interfere with the ability of the first user 202 to hear the speech 220, which is output through the speaker of the first wearable audio device 210 in accordance with one or more of the techniques discussed herein. To reduce the noise from the environment 200, the first wearable audio device 210 can perform noise cancellation. For example, the first wearable audio device 210 can output antiphase audio signals that cancel or reduce the noise from the environment 200 (e.g., the first audio signals, or the one or more second portions of these signals, collected through the first microphone).

Given that the second audio signals, or the first portion of the second audio signals that includes the speech 220, are output through the first wearable audio device 210 after signal processing and wireless transmission, the second audio signals can be output from the speaker of the first wearable audio device 210 with a latency. Thus, the speech 220 can be heard twice by the first user 202. For example, the first user 202 can initially hear the speech 220 directly from the second user 204 (e.g., exclusive of the first wearable audio device 210 and with interference from the noisy environment 200), and then the user can hear the speech 220 as an output from the first wearable audio device 210. To prevent this reverberation, the first portion of the first audio signals collected at the first microphone, which is indicative of the speech 220, can be attenuated using noise cancellation. In some implementations, the first portion of the first audio signals can be combined with the first portion of the second audio signals to create audio signals indicative of the speech 220 that have a higher quality (e.g., higher signal-to-noise ratio or higher magnitude). The higher-quality audio signals can then be output through the speaker of the first wearable audio device 210.

Although illustrated with only two proximate users, the techniques can similarly be implemented with a plurality of proximate users (e.g., three, four, ten, and so on). For example, multiple primary audio signals are determined when multiple users are speaking to a same user. Moreover, in some embodiments, the one or more primary audio signals are isolated from multiple instances of speech proximate but not directed to that user. Accordingly, the techniques can be used to improve communications between a plurality of users or in an environment that includes a plurality of users.

Example Methods

This disclosure now turns to methods for audio communication between proximate devices in accordance with one or more embodiments of the present technology. Although illustrated in a particular configuration, operations within any of the methods may be omitted, repeated, or reorganized. Moreover, any of the methods may include additional operations, for example, those detailed in one or more other methods described herein. In aspects, the methods can be described with respect to earpieces, however, these methods could be implemented with any other audio device, such as one or more wearable audio devices disclosed herein.

Figure 3:
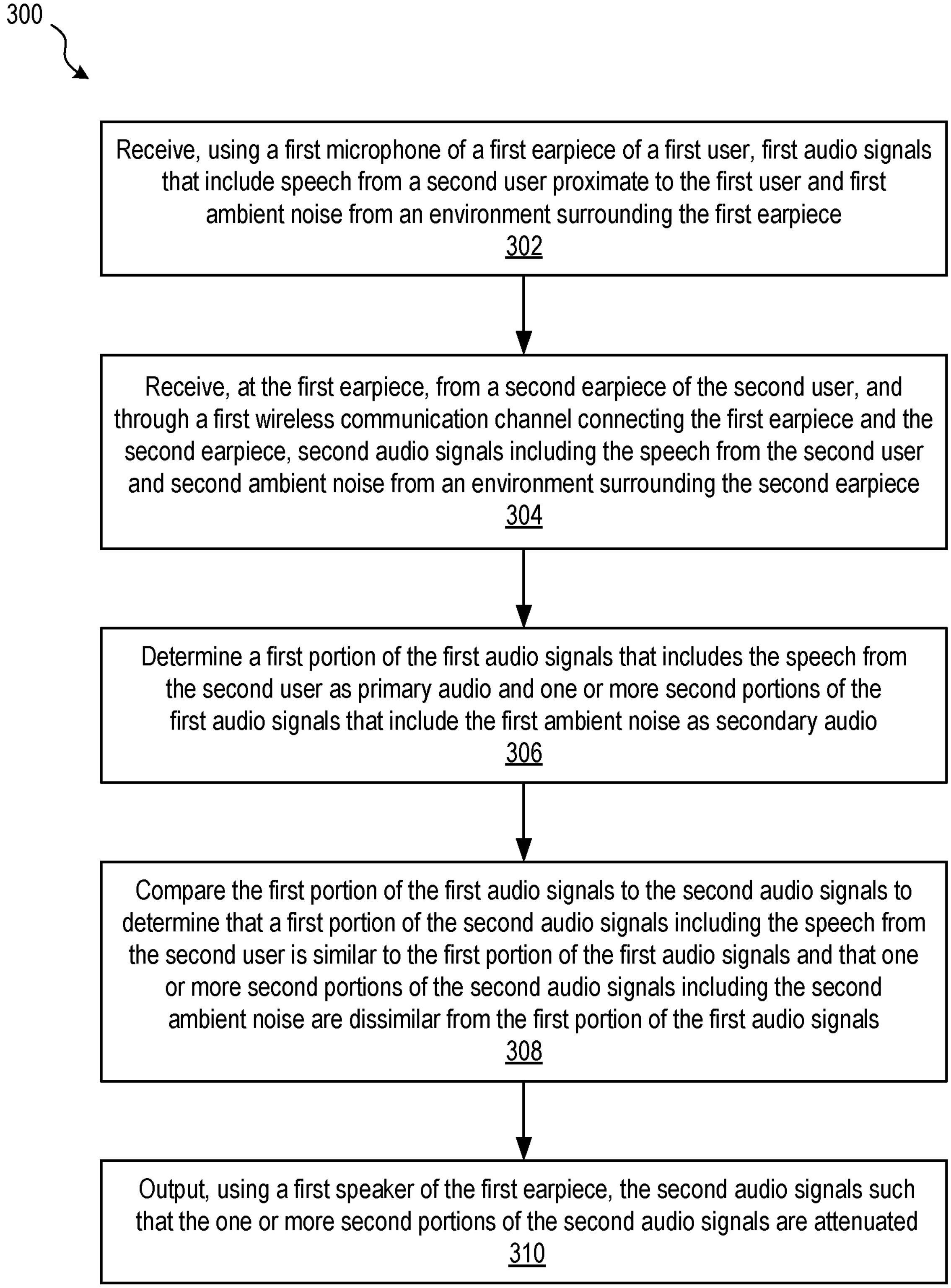
FIG. 3 illustrates a method for audio communication between proximate devices in accordance with embodiments of the present technology.

FIG. 3 illustrates a method 300 for audio communication in accordance with embodiments of the present technology. At 302, a first microphone of a first earpiece worn by a first user receives first audio signals that include speech from a second user proximate to the first user and first ambient noise from an environment surrounding the first earpiece. At 304, the first earpiece receives, from a second earpiece of the second user and through a first wireless communication channel connecting the first earpiece and the second earpiece, second audio signals including the speech from the second user and second ambient noise from an environment surrounding the second earpiece. At 306, a first portion of the first audio signals that includes the speech from the second user is determined as primary audio, and one or more second portions of the first audio signals that include the first ambient noise are determined as secondary audio. At 308, the first portion of the first audio signals is compared to the second audio signals to determine that a first portion of the second audio signals that includes the speech from the second user is similar to the first portion of the first audio signals and that one or more second portions that include the second ambient noise are dissimilar to the first portion of the first audio signals. At 310, a first speaker of the first earpiece outputs the second audio signals such that the one or more second portions of the second audio signals are attenuated.

Figure 4:
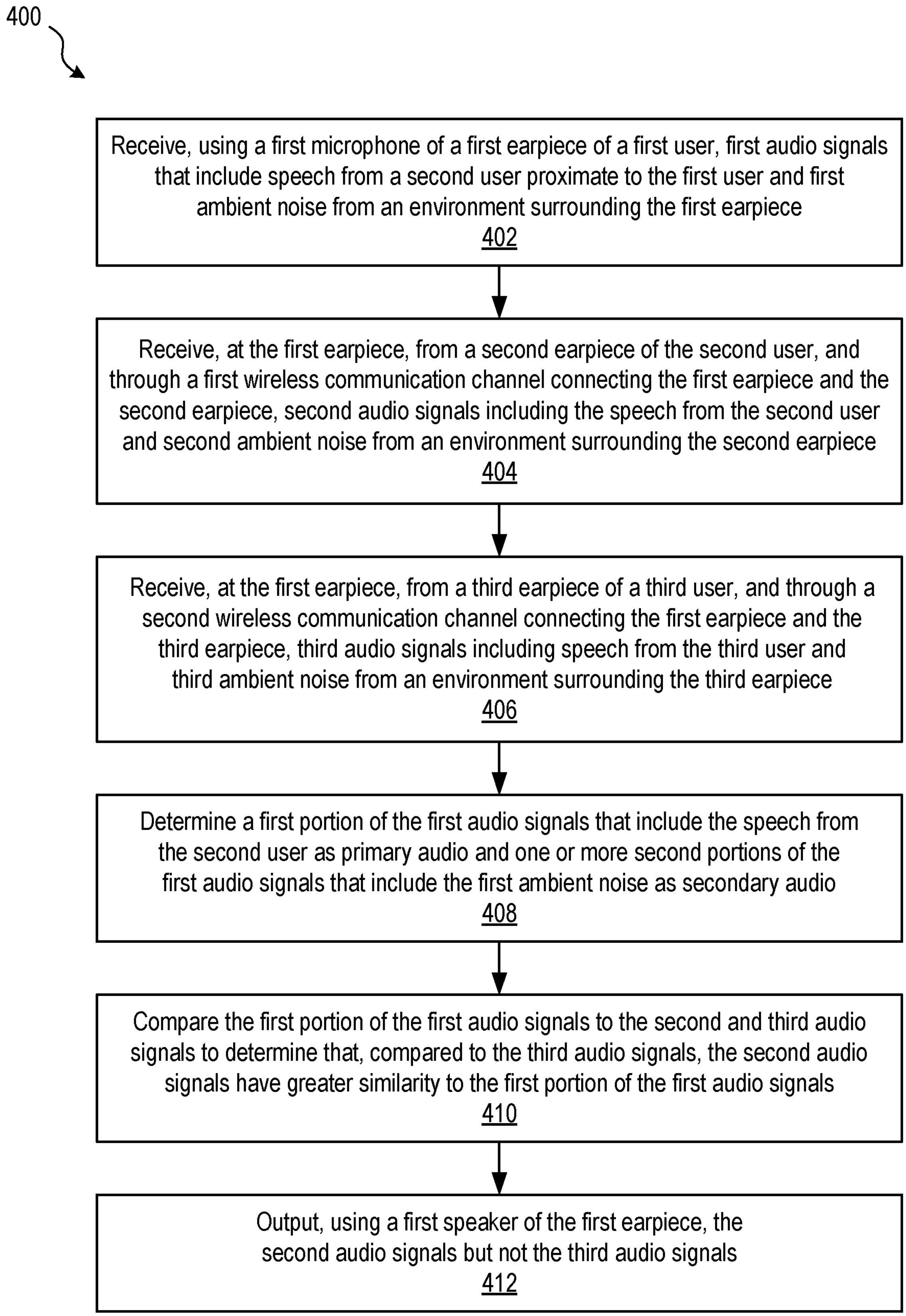
FIG. 4 illustrates a method for audio communication between proximate devices in accordance with embodiments of the present technology.

FIG. 4 illustrates a method 400 for audio communication in accordance with embodiments of the present technology. At 402, a first microphone of a first earpiece of a first user receives first audio signals that include speech from a second user proximate to the first user and first ambient noise from an environment surrounding the first earpiece. At 404, the first earpiece receives, from a second earpiece of the second user and through a first wireless communication channel connecting the first earpiece and the second earpiece, second audio signals including the speech from the second user and second ambient noise from an environment surrounding the second earpiece. At 406, the first earpiece receives, from a third earpiece of a third user and through a second wireless communication channel connecting the first earpiece and the third earpiece, third audio signals including the speech from the third user and third ambient noise from an environment surrounding the third earpiece. At 408, a first portion of the first audio signals that includes the speech from the second user is determined as primary audio, and one or more second portions of the first audio signals that include the first ambient noise are determined as secondary audio. At 410, the first portion of the first audio signals is compared to the second and third audio signals to determine that, compared to the third audio signals, the second audio signals have greater similarity to the first portion of the first audio signals. At 412, a first speaker of the first earpiece outputs the second audio signals but not the third audio signals.

The functions described herein can be implemented in hardware, software executed by a processor, firmware, or any combination thereof. Other examples and implementations are within the scope of the disclosure and appended claims. Features implementing functions can also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

From the foregoing, it will be appreciated that specific embodiments of the invention have been described herein for purposes of illustration, but that various modifications can be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method comprising:

receiving, using a first microphone of a first wearable audio device of a first user, first audio signals that include speech from a second user proximate to the first user and first ambient noise from an environment surrounding the first wearable audio device;

receiving, at the first wearable audio device, from a second wearable audio device of the second user, and through a first wireless communication channel connecting the first wearable audio device and the second wearable audio device, second audio signals collected at a second microphone of the second wearable audio device, the second audio signals including the speech from the second user and second ambient noise from an environment surrounding the second wearable audio device;

determining that a first portion of the first audio signals that includes the speech from the second user is primary audio and that one or more second portions of the first audio signals that include the first ambient noise from the environment surrounding the first wearable audio device are secondary audio;

responsive to determining the first portion of the first audio signals as the primary audio, comparing the first portion of the first audio signals to the second audio signals to determine that a first portion of the second audio signals is similar to the first portion of the first audio signals and one or more second portions of the second audio signals are dissimilar to the first portion of the first audio signals, wherein the first portion of the second audio signals includes the speech from the second user and the one or more second portions of the second audio signals include the second ambient noise; and responsive to determining that the first portion of the second audio signals is similar to the first portion of the first audio signals, outputting, using a first speaker of the first wearable audio device, the second audio signals such that the one or more second portions of the second audio signals are attenuated.

2. The method of claim 1, wherein outputting the second audio signals such that the one or more second portions of the second audio signals are attenuated comprises canceling or filtering the one or more second portions of the second audio signals from the second audio signals.

3. The method of claim 1, wherein determining the first portion of the first audio signals as the primary audio comprises determining that a first signal strength of the first portion of the first audio signals is greater than a second signal strength of the one or more second portions of the first audio signals.

4. The method of claim 1, further comprising:

combining the first portion of the first audio signals and the second portion of the second audio signals to create third audio signals that include the speech from the second user; and outputting the third audio signals using the first speaker.

5. The method of claim 1, wherein:

the first ambient noise includes speech from a third user proximate to the first user; and the method further comprises:

receiving, at the first wearable audio device, from a third wearable audio device of the third user, and using a second wireless communication channel connecting the first wearable audio device and the third wearable audio device, third audio signals collected at a third microphone of the third wearable audio device, the third audio signals including the speech from the third user;

comparing the first portion of the first audio signals to the second audio signals and the third audio signals to determine that, compared to the third audio signals, the second audio signals have greater similarity to the first portion of the first audio signals; and responsive to determining that the second audio signals have greater similarity to the first portion of the first audio signals, outputting, using the first speaker of the first wearable audio device, the second audio signals but not the third audio signals.

6. The method of claim 1, wherein the first wireless communication channel is a Bluetooth or ultra-wideband communication channel.

7. The method of claim 1, further comprising outputting, using the first speaker of the first wearable audio device, cancellation audio signals to attenuate the first audio signals.

8. The method of claim 1, further comprising connecting, using an electronic device connected to the first wearable audio device or the second wearable audio device, the first wearable audio device and the second wearable audio device to enable wireless communication between the first wearable audio device and the second wearable audio device.

9. A first wearable audio device of a first user, the first wearable audio device comprising:

a wireless transceiver;

at least one microphone;

at least one speaker;

at least one processor; and at least one non-transitory computer-readable media comprising machine-executable instructions that, when executed by the at least one processor, cause the at least one processor to:

receive, using the at least one microphone, first audio signals that include speech from a second user proximate to the first wearable audio device and first ambient noise from an environment surrounding the first wearable audio device;

receive, at the first wearable audio device, from a second wearable audio device of the second user, and through a first wireless communication channel connecting the first wearable audio device and the second wearable audio device, second audio signals that include the speech from the second user and second ambient noise from an environment surrounding the second wearable audio device;

determine that a first portion of the first audio signals that include the speech from the second user is primary audio and that one or more second portions of the first audio signals that include the first ambient noise from the environment surrounding the first wearable audio device are secondary audio;

responsive to determining the first portion of the first audio signals as the primary audio, compare the first portion of the first audio signals to the second audio signals to determine that a first portion of the second audio signals is similar to the first portion of the first audio signals and that one or more second portions of the second audio signals are dissimilar to the first portion of the first audio signals, wherein the first portion of the second audio signals includes the speech from the second user and the one or more second portions of the second audio signals include the second ambient noise; and responsive to determining that the first portion of the second audio signals is similar to the first portion of the first audio signals, output, using the at least one speaker, the second audio signals such that the one or more second portions of the second audio signals are attenuated.

10. The first wearable audio device of claim 9, wherein outputting the second audio signals such that the one or more second portions of the second audio signals are attenuated comprises canceling or filtering the one or more second portions of the second audio signals from the second audio signals.

11. The first wearable audio device of claim 9, wherein determining the first portion of the first audio signals as the primary audio comprises determining that a first signal strength of the first portion of the first audio signals is greater than a second signal strength of the one or more second portions of the first audio signals.

12. The first wearable audio device of claim 9, wherein the instructions further cause the at least one processor to:

combine the first portion of the first audio signals and the second portion of the second audio signals to create third audio signals that include the speech from the second user; and output the third audio signals using the at least one speaker.

13. The first wearable audio device of claim 9, wherein the wireless communication channel is a Bluetooth or ultra-wideband communication channel.

14. The first wearable audio device of claim 9, wherein the instructions further cause the at least one processor to output, using the at least one speaker, cancellation audio signals to attenuate the first audio signals.

15. A first wearable audio device of a first user, the first wearable audio device comprising:

a wireless transceiver;

at least one microphone;

at least one speaker;

at least one processor; and at least one non-transitory computer-readable media comprising machine-executable instructions that, when executed by the at least one processor, cause the at least one processor to:

receive, using the at least one microphone, first audio signals that include speech from a second user proximate to the first wearable audio device and first ambient noise from an environment surrounding the first wearable audio device;

receive, at the first wearable audio device, from a second wearable audio device of the second user, and through a first wireless communication channel connecting the first wearable audio device and the second wearable audio device, second audio signals that include the speech from the second user and second ambient noise from an environment surrounding the second wearable audio device;

receive, at the first wearable audio device, from a third wearable audio device of a third user, and through a second wireless communication channel connecting the first wearable audio device and the third wearable audio device, third audio signals that include speech from the third user and third ambient noise from an environment surrounding the third wearable audio device;

determine that a first portion of the first audio signals that includes the speech from the second user is primary audio and that one or more second portions of the first audio signals that include the first ambient noise from the environment surrounding the first wearable audio device are secondary audio;

responsive to determining the first portion of the first audio signals as the primary audio, compare the first portion of the first audio signals to the second audio signals and the third audio signals to determine that, compared to the third audio signals, the second audio signals have greater similarity to the first portion of the first audio signals; and responsive to determining that the second audio signals have greater similarity to the first portion of the first audio signals, output, using the at least one speaker, the second audio signals but not the third audio signals.

16. The first wearable audio device of claim 15, wherein the first ambient noise includes the speech from the third user.

17. The first wearable audio device of claim 15, wherein:

the second audio signals comprise a first portion that includes the speech of the second user;

the third audio signals comprise a first portion that includes the speech of the second user; and determining that the second audio signals have greater similarity to the first portion of the first audio signals includes determining that a first signal strength of the first portion of the second audio signals is greater than a second signal strength of the first portion of the third audio signals.

18. The first wearable audio device of claim 15, wherein the instructions further cause the at least one processor to output, using the at least one speaker, cancellation audio signals to attenuate the first audio signals.

19. The first wearable audio device of claim 15, wherein the first wireless communication channel or the second wireless communication channel is a Bluetooth or ultra-wideband communication channel.

20. The first wearable audio device of claim 15, wherein the instructions further cause the at least one processor to:

compare the first portion of the first audio signals to the second audio signals to determine that a first portion of the second audio signals is similar to the first portion of the first audio signals and that a second portion of the second audio signals is dissimilar to the first portion of the first audio signals, wherein the first portion of the second audio signals includes the speech from the second user; and in response to determining that the first portion of the second audio signals is similar to the first portion of the first audio signals, output, using the at least one speaker, the first portion of the second audio signals but not the second portion of the second audio signals.

* * * * *